US011593947B2

(12) United States Patent
Jennings et al.

(10) Patent No.: US 11,593,947 B2
(45) Date of Patent: Feb. 28, 2023

(54) AUTOMATIC ADJUSTING BACKGROUND

(71) Applicant: Cisco Technology, Inc., San Jose, CA (US)

(72) Inventors: Cullen Frishman Jennings, Calgary (CA); Ashley Alexis Hamic, Livermore, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 186 days.

(21) Appl. No.: 16/814,071

(22) Filed: Mar. 10, 2020

(65) Prior Publication Data
US 2021/0287377 A1    Sep. 16, 2021

(51) Int. Cl.
G06T 7/194 (2017.01)
G06T 7/215 (2017.01)
H04L 12/18 (2006.01)
H04L 67/306 (2022.01)
G06T 7/11 (2017.01)

(52) U.S. Cl.
CPC .......... G06T 7/194 (2017.01); G06T 7/11 (2017.01); G06T 7/215 (2017.01); H04L 12/1827 (2013.01); H04L 67/306 (2013.01)

(58) Field of Classification Search
CPC . G06T 7/11; G06T 7/194; G06T 2207/10016; G06T 2207/10024; G06T 7/215; G06T 7/90; H04L 12/1827; H04L 67/306
See application file for complete search history.

(56) References Cited

U.S. PATENT DOCUMENTS

| 4,811,084 | A | 3/1989 | Belmares-Sarabia et al. |
| 6,490,006 | B1 | 12/2002 | Monjo |
| 8,798,168 | B2 | 8/2014 | Lee et al. |
| 8,928,659 | B2 | 1/2015 | Bar-Zeev et al. |
| 10,003,769 | B2 | 6/2018 | Kim et al. |
| 10,162,308 | B2 | 12/2018 | Du |
| 10,163,256 | B2 | 12/2018 | Benedek et al. |
| 2006/0285747 | A1* | 12/2006 | Blake ..................... G06T 7/254 382/180 |

(Continued)

OTHER PUBLICATIONS

Huang H. et al., "Practical Automatic Background Substitution for Live Video", link.springer.com, vol. 3, Sep. 2017, pp. 273-284.

(Continued)

Primary Examiner — Margaret G Mastrodonato
(74) Attorney, Agent, or Firm — Edell, Shapiro & Finnan, LLC

(57) ABSTRACT

A conferencing endpoint selects a background for a conferencing system. The conferencing endpoint captures an initial series of images of a foreground object in front of a background image, and segments at least one frame of the initial series of images into the foreground object and the background image according to a first segmentation technique. The conferencing endpoint generates one or more test backgrounds and evaluates the test backgrounds according to a second segmentation technique. The conferencing endpoint selects a final background from the test backgrounds for segmenting a subsequent series of images according to the second segmentation technique.

20 Claims, 6 Drawing Sheets

(56) References Cited

U.S. PATENT DOCUMENTS

| | | | |
|---|---|---|---|
| 2008/0226273 A1* | 9/2008 | Kaku | H04N 5/272 |
| | | | 396/3 |
| 2017/0287140 A1* | 10/2017 | Cardin | H04N 5/262 |
| 2018/0115717 A1* | 4/2018 | Kao | G06T 7/50 |
| 2019/0005613 A1* | 1/2019 | Ogura | G06V 10/255 |
| 2019/0313071 A1* | 10/2019 | Chen | H04N 9/75 |
| 2019/0355172 A1* | 11/2019 | Dsouza | G06T 17/00 |

OTHER PUBLICATIONS

Statt N., "Wyze adds AI-powered people detection to its $20 Wyze Cam Line", The Verge, Jul. 9, 2019, 3 pages.

Guru A., "Detecting people with a RaspberryPi, a thermal camera and machine learning", Sep. 27, 9 pages. retrieved from Internet Dec. 16, 2019; https://towardsdatascience.com/detecting-people-with-a-raspberrypi-a-thermal-camera-and-machine-learning-376d3bbcd45c.

Fleck M. et al., "Finding Naked People", In European conference on computer vision, Apr. 1996, 10 pages.

Ramirez, G. et al., "New Trends on Dynamic Object Segmentation in Video Sequences: A Survey", RIEE&C, Magazine of Electrical, Electronic and Computer Engineering, vol. 11 No. 1, Dec. 2013, 14 pages.

\* cited by examiner

AUTOMATIC ADJUSTING BACKGROUND

TECHNICAL FIELD

The present disclosure relates to adjusting backgrounds in a video conferencing system to assist in segmenting foreground objects from the adjustable background.

BACKGROUND

Image segmentation is used to separate portions of captured images corresponding o different physical objects. For instance, background segmentation may be used to separate a foreground object that is placed in front of a background. Chroma keying is one common approach for background segmentation of images of people. Various colors of backgrounds (e.g., green and blue) have been used to optimize the segmentation result. However, background segmentation presents challenges when the people in the foreground look similar to what the segmentation algorithm classifies as the background. For instance, the segmentation algorithm may classify a person's torso as part of the background if the person is wearing a shirt that is a shade of green similar to a green screen background.

DESCRIPTION OF EXAMPLE EMBODIMENTS

Overview

A computer implemented method is provided to select a background for a conferencing system. The method includes capturing an initial series of images of a foreground object in front of a background image, and segmenting at least one frame of the initial series of images into the foreground object and the background image according to a first segmentation technique. The method also includes generating one or more test backgrounds and evaluating the test backgrounds according to a second segmentation technique. The method further includes selecting a final background from the test backgrounds for segmenting a subsequent series of images according to the second segmentation technique.

Example Embodiments

In one implementation of background segmentation, a conferencing system may separate images of the users from the backgrounds behind the users. Separating the image of the person of interest from the background allows for the conferencing system to manipulate the conference video. For instance, the conferencing system may insert a different background to portray the user as being in a different location (e.g., in an office, in a conference room, at the beach, etc.). Additionally, the conferencing system may lower bandwidth requirements by transmitting only the image of the foreground user without any background. Further, the conferencing system may use the separated foreground image of the user to build a holographic model of the user, which may be transmitted in a holographic conferencing experience. For the holographic conferencing experience, specific criteria for the background allow the conferencing system to optimally capture the user and render a good hologram. A single background does not allow the conferencing system to optimally capture all users, whose appearance may vary depending on the user and what each user is wearing at any particular time.

Figure 1:
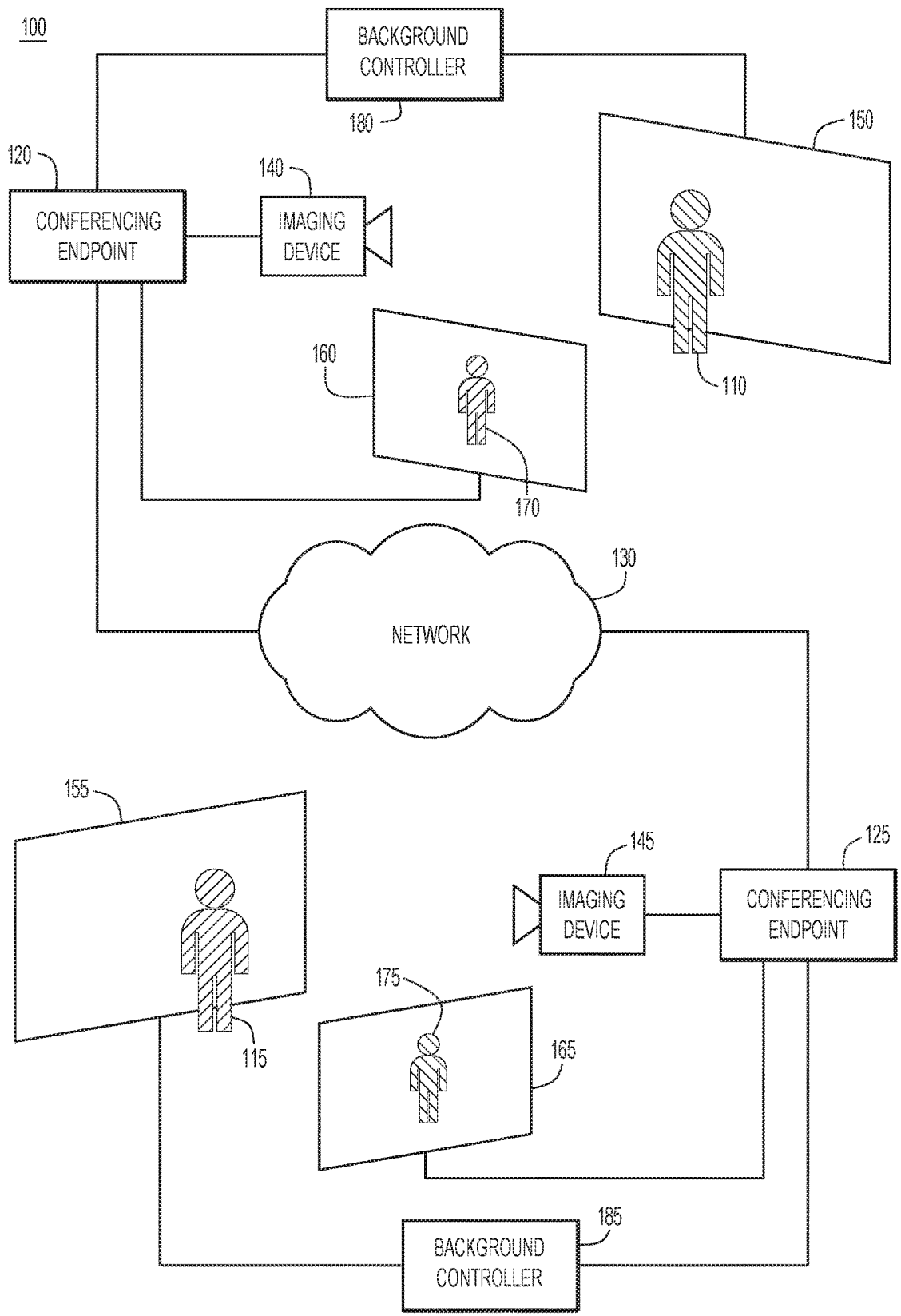
FIG. 1 is a simplified block diagram of a conferencing system with an automatically adjustable background, according to an example embodiment.

Referring now to FIG. 1, a simplified diagram of a conferencing system 100 is shown. The conferencing system 100 enables a user 110 to communicate with a user 115 using respective conferencing endpoints 120 and 125. The conferencing endpoints 120 and 125 communicate in a conferencing session over a network 130, and may include additional endpoints that are not shown in FIG. 1.

The conferencing endpoint 120 is connected to an imaging device 140 (e.g., a camera) that captures images of the user 110 against an adjustable background 150. Similarly, the conferencing endpoint 125 is connected to an imaging device 145 that captures images of the user 115 against an adjustable background 155. In one example, the imaging device 140 and/or imaging device 145 may comprise multiple cameras positioned to capture images from different perspectives. The conferencing endpoint 120 is also connected to a monitor 160, on which the user 110 can see an image 170 of the user 115. Similarly, the conferencing endpoint 125 is connected to a monitor 165, on which the user 115 can see an image 175 of the user 110.

The conferencing endpoint 120 is further connected to a background controller 180 that controls the adjustable background 150. Similarly, the conferencing endpoint 125 is connected to a background controller 185 that controls the adjustable background 155. In one example, the background controllers 180 and 185 may be integrated with the adjustable backgrounds 150 and 155, respectively, or with the conferencing endpoints 120 and 125, respectively.

Figure 2A:
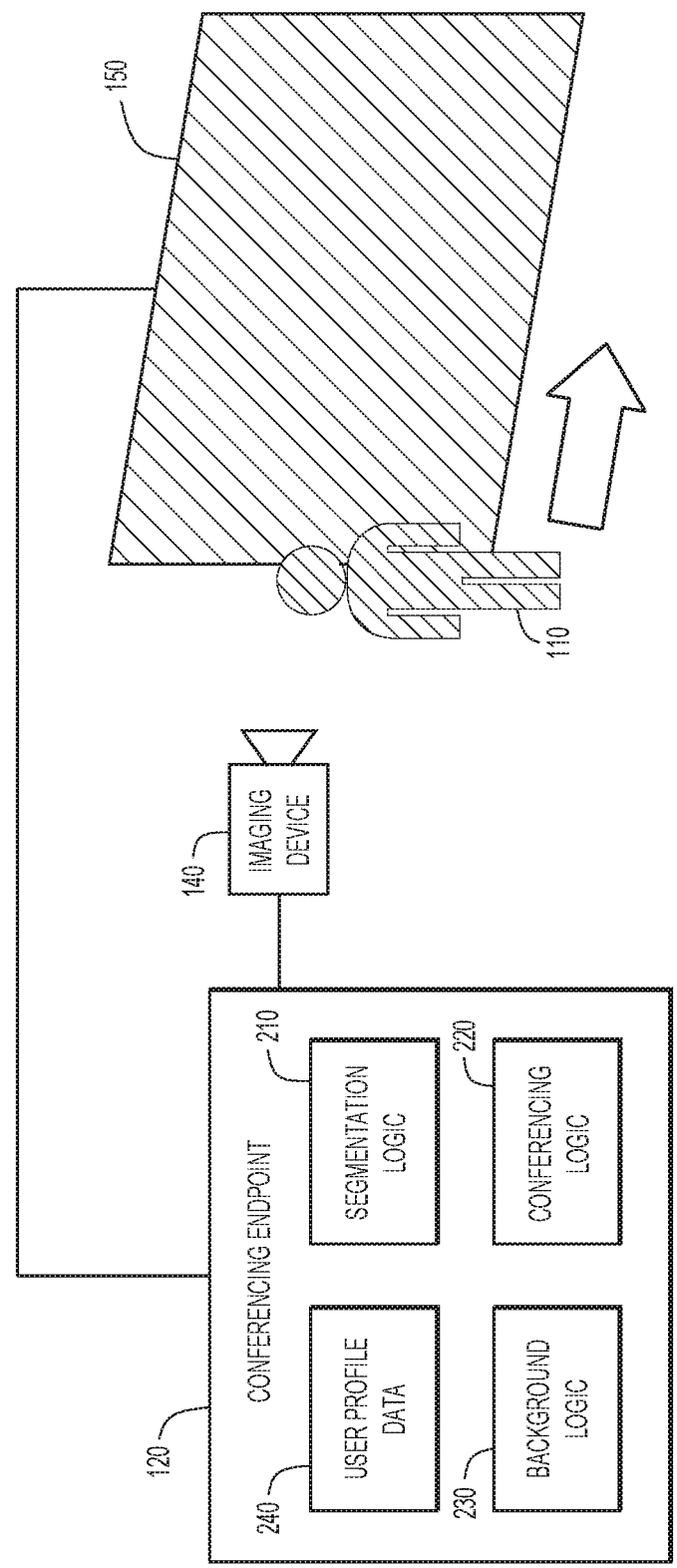
FIG. 2A is a simplified block diagram of a user initially using a conferencing endpoint, according to an example embodiment.

Referring now to FIG. 2A, a simplified block diagram illustrates the user 110 initiating a conferencing session at the conferencing endpoint 120. The conferencing endpoint 120 includes segmentation logic 210 configured to segment images from the imaging device 140 into foreground objects (e.g., user 110) and a background image (e.g., background 150). In one example, the segmentation logic 210 may be configured to segment the captured images via different techniques, such as motion based techniques (e.g., based on changes in pixels in a series of captured images) or feature based techniques (e.g., chroma keying).

The conferencing endpoint 120 also includes conferencing logic 220 configured to communicate with other conferencing endpoints (e.g., conferencing endpoint 125 shown in FIG. 1) or with one or more intermediary conference servers or network devices. The conferencing endpoint 120 also includes background logic 230 that is configured to adjust the background 150. In one example, the background logic 230 may interface with a controller (e.g., background controller 180 shown in FIG. 1) to adjust the background

150. Alternatively, the background logic 230 may be configured to send commands directly to the adjustable background 150 in order to change features (e.g., color and/or pattern) of the background 150.

The conferencing endpoint 120 includes user profile data 240 associated with users that may use the conferencing endpoint, such as user 110. In one example, the user profile data may include physical characteristics that may assist in segmenting an image of the user 110 from the background 150. For instance, the user profile data 240 may include static physical characteristics that are unlikely to change significantly over long periods of time (e.g., height, basic skin tone, eye color, conditions requiring assistive technologies such as a wheelchair, crutches, eyeglasses, hearing aids, etc.). Additionally, the user profile data 240 may include physical characteristics that typically describe a user, but that are not necessarily always associated with the user (e.g., hair color, hairstyle, preferred clothing type/color, etc.).

In one example, the conferencing system 100 may be located in a separate room or dedicated environment, which a user 110 accesses to use the conferencing endpoint 120. The user 110 may authenticate (e.g., with an employee badge) their access to the conferencing endpoint 120 before entering a room with the adjustable background 150. The authentication process may also provide the conferencing endpoint 120 with user profile information 240 or other preferences associated with the user 110. The adjustable background 150 begins with a neutral background color that allows the segmentation logic 210 to detect a wide range of users with a reasonable probability of success.

Once the user 110 enters the room, the imaging device 140 activates and detect additional physical characteristics of the user 110, such as a precise skin tone, hair color, clothing color and/or patterns, or hairstyle. The imaging device 140 may detect physical characteristics via multiple methods of data collection and analysis, such as visible light, infrared, motion detection, face detection, skin detection, or machine learning-based detection of people. A combination of any of these techniques may be used to determine an initial segmentation that accurately separates the image of the user from the background.

To accurately separate images of the user from the background, the conferencing endpoint 120 may process the initial segmentation over a longer time frame than would be acceptable in a real-time conference. For instance, a motion segmentation technique may detect changes across one or more frames of video as the moving user 110 crosses the stationary background 150. Additionally, the conferencing endpoint 120 may use additional time processing multiple segmentation techniques to ensure that the initial segmentation is accurate.

Figure 2B:
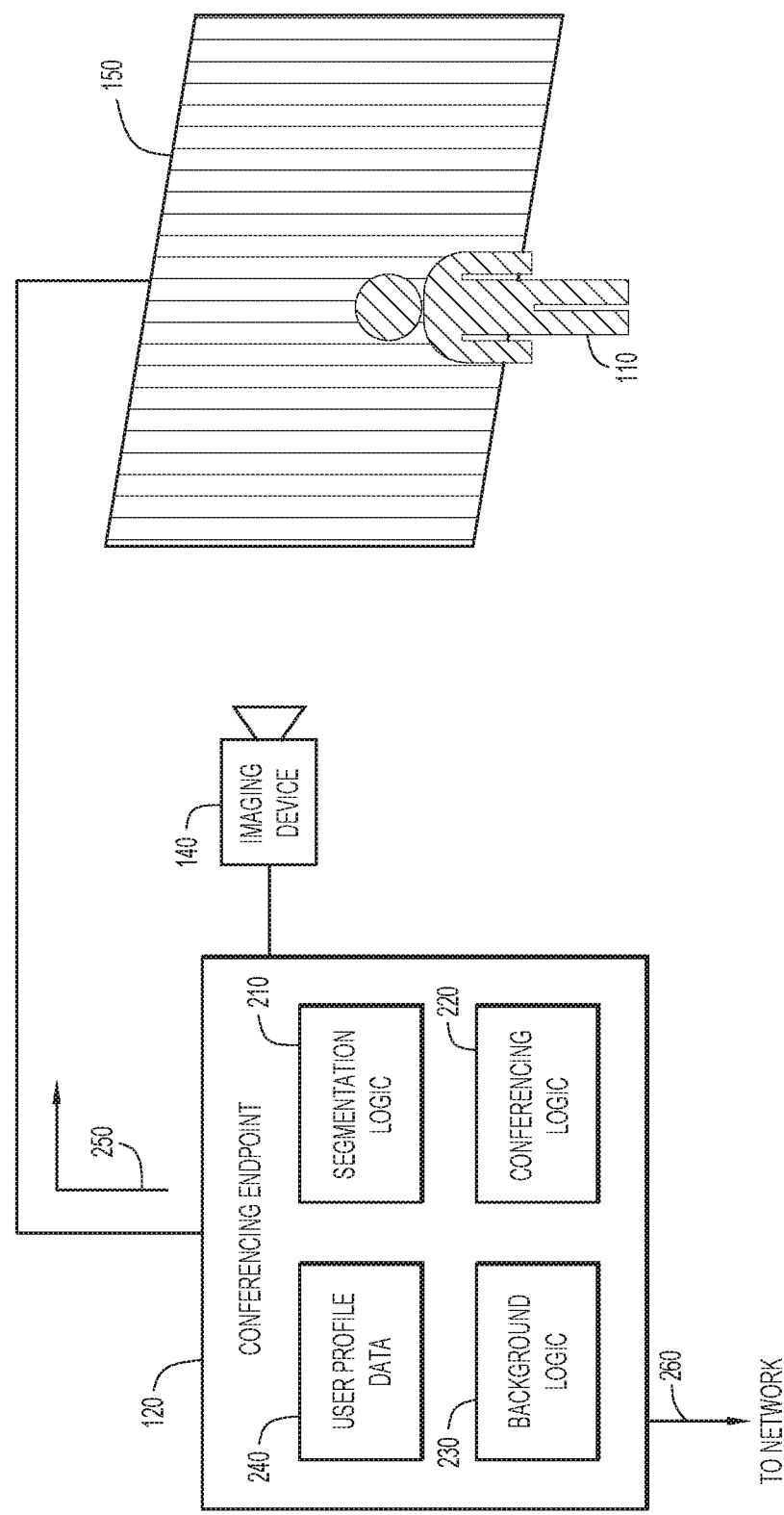
FIG. 2B is a simplified block diagram of adjusting a background to assist in segmenting an image of a user in front of the background, according to an example embodiment.

A motion segmentation technique typically provides an accurate separation of the user 110 from the background 150 when the user 110 first enters the room with the background 150. However, once the conference begins, the user 110 may remain relatively stationary, leading to a degradation in the ability of the motion segmentation technique to separate the user 110 from the background 150. To ensure continued segmentation that is accurate and timely, the conferencing endpoint 120 may determine that a different background would enable a different segmentation technique to be used during the conference, as shown in FIG. 2B.

Once the conferencing endpoint 120 has determined an accurate initial segmentation of the user 110 from the background 150 using one or more segmentation techniques, the conferencing endpoint 120 identifies an optimal background for the experience and sends a command 250 to the background 150 to adjust the background 150 prior to the conference starting. The conferencing endpoint 120 may determine the optimal background based on a Bayesian approach to multiple different test backgrounds, evaluate each test background, and determine which test background performs optimally (e.g., minimizes the probability of false detection). For instance, if the conferencing endpoint 120 is configured to segment via chroma keying, then the conferencing endpoint would select a color for the background 150 that does not match any clothing or accessories that the user 110 is wearing.

In one example, the background 150 may be configured to change via a number of different mechanisms. According to one mechanism, the background 150 may comprise a plurality of multi-sided polyhedra, with each face of each polyhedron displaying a different color and/or pattern. The conferencing endpoint 120 selects the optimal background color/design and rotates the polyhedral to each display the selected color/design. According to another background adjustment mechanism, the background 150 may include a plurality of flip cards (e.g., similar to legacy airline or train arrival/departure boards) with different colors and/or designs on each card. The conferencing endpoint 120 selects the optimal background and flips the cards to display the selected background.

According to a further background adjustment mechanism, the adjustable background 150 may be a video display (e.g., one or more television screens) that is large and positioned to cover the entire viewable area of the imaging device 140. The conferencing endpoint 120 selects an image of the optimal background and sends the image to be displayed on the background 150.

In another background adjustment mechanism, large rolls of photography paper or cloth may be attached to motorized rollers. The conferencing endpoint 120 may be configured to roll out a selected roll that corresponds to the optimal background that was selected for the conference. For some conferencing applications, such as holographic conferencing, passive backgrounds that do not emit light improve the ability of the conferencing endpoint 120 to segment the captured image and process the segmented image (e.g., into a holographic model).

In a further background adjustment mechanism, the background 150 may be a panel that is illuminated by colored lights controlled by the conferencing endpoint 120. The panel may be configured to reflect the colored lights selected by the conferencing endpoint 120 to present the optimal background for ongoing segmentation. Alternatively, the panel may be a frosted/translucent panel that is backlit with computer controlled lights, such as adjustable color light emitting diodes (LEDs).

Once the conference begins, the conferencing endpoint 120 sends conferencing data 260 including, for instance, an image of the user 110 separated from the background 150. In one example, the conferencing data may include a holographic model of the user 110 for use in a holographic conferencing system. When the conference ends, the conferencing endpoint 120 may recognize the user 110 leaving the area imaged by the imaging device 140. In response to the user 110 leaving the area, the conferencing endpoint 120 may adjust the background 150 to display a neutral background while the conferencing endpoint 120 is not in use.

Figure 3:
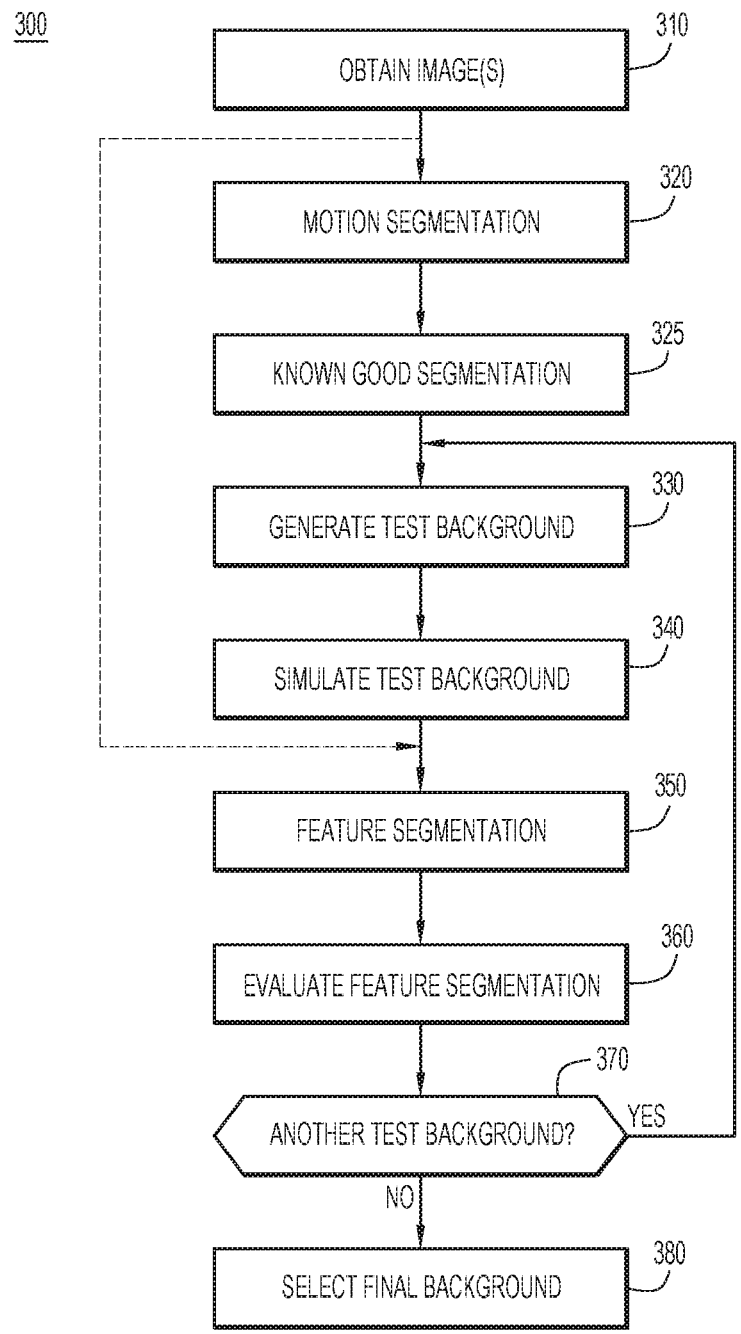
FIG. 3 is a flowchart illustrating steps associated with using motion segmentation to assist in selecting a background optimized for feature segmentation, according to an example embodiment.

Referring now to FIG. 3, a flowchart illustrates operations in one example of a process 300 to select an optimal background by a conferencing endpoint. At 310, the conferencing endpoint obtains one or more images of a foreground object (e.g., a user of the conferencing endpoint) in front of an adjustable background. The conferencing endpoint processes the images with a motion segmentation at 320 to generate a known good segmentation 325 separating the foreground object from the background. In one example, the motion segmentation technique provides a known, good segmentation by detecting differences between frames of video, such as the images obtained at 310.

At 330, the conferencing endpoint generates a test background that may provide a high contrast with the foreground object. In one example, the test background may be constrained by the capabilities of the adjustable background. Additionally, the test background may be generated based on user profile data and/or information gathered from the images that were obtained at 310. For instance, the conferencing endpoint may detect a plurality of colors in the clothing of the user, and select a color that contrasts with the color of the clothing.

At 340, the conferencing endpoint simulates the test background by placing the image of the foreground object in the known good segmentation 325 against the test background. At 350, the conferencing endpoint processes the test background composite with a feature segmentation technique that separates the foreground object from the background. In one example, the feature segmentation technique separates the foreground object from the test background based on a feature (e.g., color or pattern) of the test background. The conferencing endpoint may also process the original image(s) with the feature segmentation technique to determine whether the original background needs to be changed at all. At 360, the conferencing endpoint evaluates the feature segmentation technique on the test background to determine if the test background provides a sufficiently accurate separation of the foreground image from the background.

At 370, the conferencing endpoint determines whether to evaluate an additional test background. In one example, the determination to evaluate another test background may be based on the capabilities of the adjustable background and/or the accuracy of the feature segmentation of the previous test background. If the conferencing endpoint determines that an additional test background will be evaluated, the process 300 loops back to generate another test background at 330, simulate the test background at 340, perform the feature segmentation at 350 and evaluate the feature segmentation of the additional test background at 360. Once the conferencing background determines that no more test backgrounds need to be evaluated, the conferencing endpoint selects the final background at 380, and may direct the adjustable background to match the selected final background. In one example, the conferencing endpoint may loop through each test background available to the adjustable background, and select the best available background as the final background.

Figure 4:
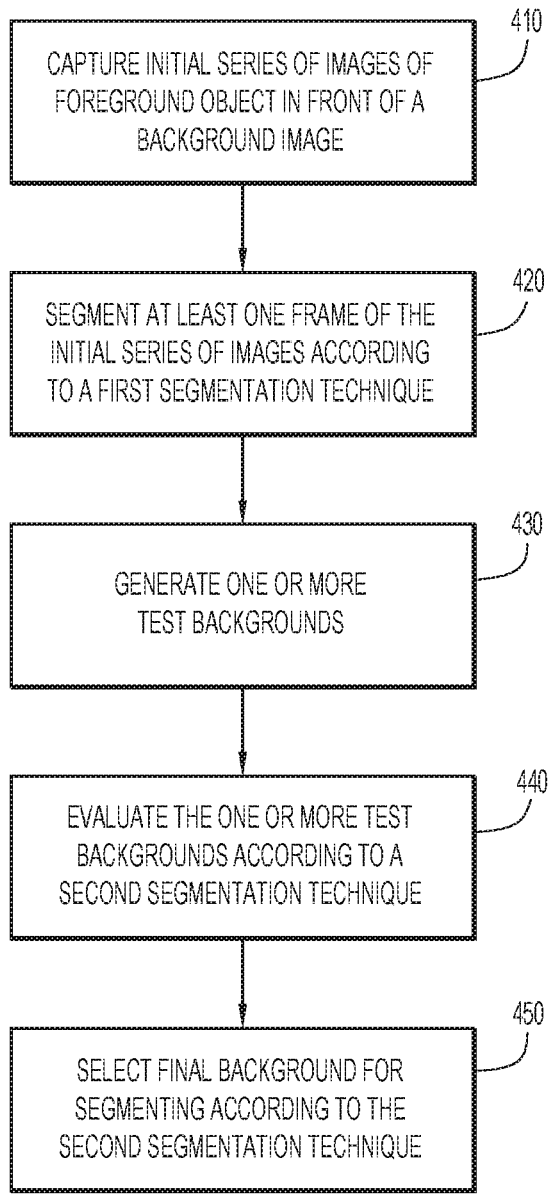
FIG. 4 is a flowchart illustrating operations of a conferencing endpoint for automatically adjusting a background, according to another example embodiment.

Referring now to FIG. 4, a flowchart illustrates operations performed at a conferencing endpoint (e.g., conferencing endpoint 120) in a process 400 for determining an optimal background for an online conference. At 410, the conferencing endpoint captures an initial series of images of a foreground object in front of a background image. In one example, the initial series of images may be captured by an imaging device (e.g., one or more video cameras) connected to the conferencing endpoint. In another example, the foreground object may be a user of the conferencing endpoint and the background image may be of an adjustable background placed in the field of view of an imaging device connected to the conferencing endpoint.

At 420, the conferencing endpoint segments at least one frame of the initial series of images into the foreground object and the background image according to a first segmentation technique. In one example, the first segmentation technique may be at least partially based on the motion of the foreground object in front of a stationary background. At 430, the conferencing endpoint generates one or more test backgrounds. In one example, the test backgrounds may be based on user profile information of a user of the conferencing endpoint and/or physical characteristics of the foreground object captured in the initial series of images.

At 440, the conferencing endpoint evaluates the one or more test backgrounds according to a second segmentation technique. In one example, the second segmentation technique is based on a physical characteristic (e.g., color or design) of the foreground object that is captured in the initial series of images. After evaluating the test backgrounds, the conferencing endpoint selects a final background from the one or more test backgrounds for segmenting a subsequent series of images according to the second segmentation technique. In one example, the final background may be selected because it is the test background that most closely matches the segmentation according to the first segmentation technique.

Figure 5:
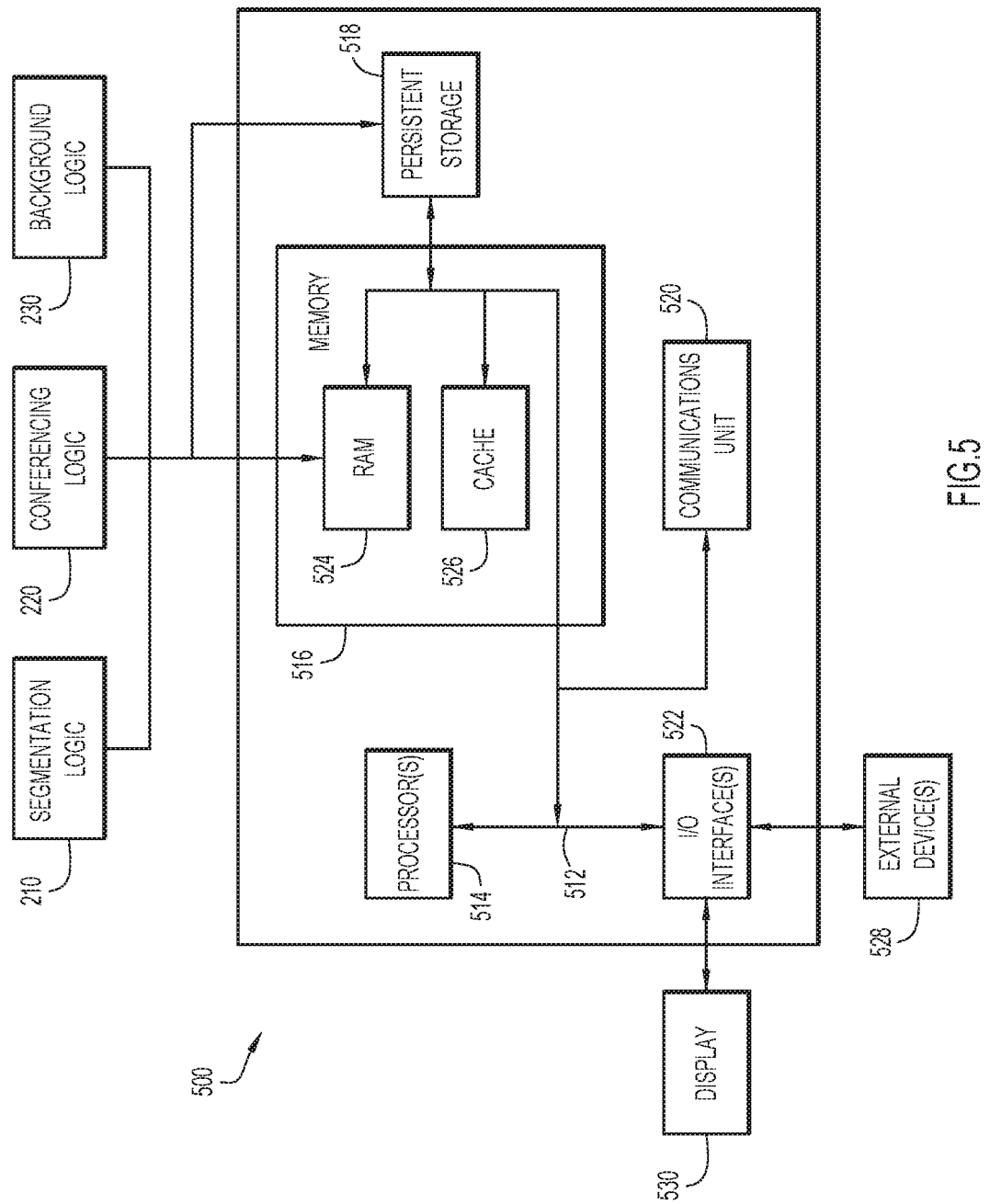
FIG. 5 illustrates a simplified block diagram of a device that may be configured to perform methods presented herein, according to an example embodiment.

Referring now to FIG. 5, a hardware block diagram illustrates a computing device 500 that may perform the functions of any of the servers or computing or control entities (e.g., conferencing endpoint 120) referred to herein in connection with the adjustable background conferencing system described herein. It should be appreciated that FIG. 5 provides only an illustration of one embodiment and does not imply any limitations with regard to the environments in which different embodiments may be implemented. Many modifications to the depicted environment may be made.

As depicted, the device 500 includes a bus 512, which provides communications between computer processor(s) 514, memory 516, persistent storage 518, communications unit 520, and input/output (I/O) interface(s) 522. Bus 512 can be implemented with any architecture designed for passing data and/or control information between processors (such as microprocessors, communications and network processors, etc.), system memory, peripheral devices, and any other hardware components within a system. For example, bus 512 can be implemented with one or more buses.

Memory 516 and persistent storage 518 are computer readable storage media. In the depicted embodiment, memory 516 includes random access memory (RAM) 524 and cache memory 526. In general, memory 516 can include any suitable volatile or non-volatile computer readable storage media. Instructions for the segmentation logic 210, conferencing logic 220, and/or background logic 230 may be stored in memory 516 or persistent storage 518 for execution by processor(s) 514.

One or more programs may be stored in persistent storage 518 for execution by one or more of the respective computer processors 514 via one or more memories of memory 516. The persistent storage 518 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 518 may also be removable. For example, a removable hard drive may be used for persistent storage 518. Other examples include optical and magnetic disks, thumb drives, and smart cards that are inserted into a drive for transfer onto another computer readable storage medium that is also part of persistent storage 518.

Communications unit 520, in these examples, provides for communications with other data processing systems or devices. In these examples, communications unit 520 includes one or more network interface units, such as network interface cards. Communications unit 520 may provide communications through the use of either or both physical and wireless communications links.

I/O interface(s) 522 allows for input and output of data with other devices that may be connected to computer device 500. For example, I/O interface 522 may provide a connection to external devices 528 such as a keyboard, keypad, a touch screen, and/or some other suitable input device. External devices 528 can also include portable computer readable storage media such as database systems, thumb drives, portable optical or magnetic disks, and memory cards.

Software and data used to practice embodiments can be stored on such portable computer readable storage media and can be loaded onto persistent storage 518 via I/O interface(s) 522. I/O interface(s) 522 may also connect to a display 530. Display 530 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the test module, the network device, the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to user identities or credentials). The database system may be included within or coupled to the server and/or client systems. The database systems and/or storage structures may be remote from or local to the computer or other processing systems, and may store any desired data (e.g., data relating to user authentication/authorization or credentials).

The present embodiments may employ any number of any type of user interface (e.g., Graphical User Interface (GUI), command-line, prompt, etc.) for obtaining or providing information (e.g., data relating to user authentication/authorization or credentials), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In summary, the techniques presented herein are designed to identify the appearance of a foreground object, such as what a user looks like, and adjust the background of the conferencing system. The background is automatically adjusted to improve the capture and segmentation of the foreground object from the background, and optimize the experience for the viewer. The techniques presented herein combine multiple segmentation techniques (e.g., chroma keying, range images, machine learning-based face detection, etc.) to adjust the background and optimize the ongoing segmentation during the conference session.

In one form, a method is provided to select a background for a conferencing system. The method includes capturing an initial series of images of a foreground object in front of a background image, and segmenting at least one frame of the initial series of images into the foreground object and the background image according to a first segmentation technique. The method also includes generating one or more test backgrounds and evaluating the test backgrounds according to a second segmentation technique. The method further includes selecting a final background from the test backgrounds for segmenting a subsequent series of images according to the second segmentation technique.

In another form, an apparatus comprising a communications interface and a processor is provided. The communications interface is configured to communicate with a plurality of computing devices. The processor is configured to obtain an initial series of images of a foreground object in front of a background image, and segment at least one frame of the initial series of images into the foreground object and the background image according to a first segmentation technique. The processor is also configured to generate one or more test backgrounds and evaluate the test backgrounds according to a second segmentation technique. The processor is further configured to select a final background from the test backgrounds for segmenting a subsequent series of images according to a second segmentation technique.

In still another form, a system comprising an imaging device, an adjustable background, and a conferencing endpoint is provided. The imaging device is configured to capture images of a foreground object in front of a background image. The adjustable background is configured to provide the background image. The conferencing endpoint is configured to obtain an initial series of images from the imaging device and segment at least one frame of the initial series of images into the foreground object and the background image according to a first segmentation technique. The conferencing endpoint is also configured to generate one or more test backgrounds and evaluate the test backgrounds according to a second segmentation technique. The conferencing endpoint is further configured to select a final background from the one or more test backgrounds for segmenting a subsequent series of images according to the second segmentation technique.

In yet another form, a non-transitory computer readable storage media is provided that is encoded with instructions that, when executed by a processor of a conferencing endpoint, cause the processor to obtain an initial series of images of a foreground object in front of a background image, and segment at least one frame of the initial series of images into the foreground object and the background image according to a first segmentation technique. The instructions also cause the processor to generate one or more test backgrounds and evaluate the test backgrounds according to a second segmentation technique. The instructions further cause the processor to select a final background from the test backgrounds for segmenting a subsequent series of images according to a second segmentation technique.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language, Python or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presented embodiments.

Aspects of the present embodiments are described herein with reference to flowchart illustrations and/or block diagrams of methods, apparatus (systems), and computer program products according to presented embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various presented embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
capturing an initial series of images of a foreground object in front of a physical background;
segmenting at least one frame of the initial series of images into a foreground image of the foreground object and a background image of the physical background according to a first segmentation technique;
generating one or more virtual test background images;
evaluating the one or more virtual test background images according to a second segmentation technique;
selecting a final background image from the one or more virtual test background images; and
adjusting the physical background to match the final background image.

2. The method of claim 1, further comprising:
capturing a subsequent series of images; and
segmenting frames of the subsequent series of images according to the second segmentation technique.

3. The method of claim 1, wherein generating the one or more virtual test background images comprises:
obtaining user profile information associated with a user captured in the initial series of images;
obtaining an indication of at least one physical characteristic of the foreground object captured in the initial series of images; and
combining the user profile information and the indication of the at least one physical characteristic to generate the one or more virtual test background images based on improving a segmentation according to the second segmentation technique.

4. The method of claim 1, wherein the first segmentation technique is based on motion of the foreground object.

5. The method of claim 1, wherein the second segmentation technique is based on at least one physical characteristic of the foreground object.

6. The method of claim 5, wherein the at least one physical characteristic of the foreground object includes one or more colors in the foreground object.

7. The method of claim 6, wherein the evaluating the one or more virtual test background images comprises comparing the one or more colors in the foreground object to a different background color of each of the one or more virtual test background images.

8. An apparatus comprising:
a communications interface configured to communicate with a plurality of computing devices; and
a processor coupled to the communications interface, the processor configured to:
obtain an initial series of images of a foreground object in front of a physical background;
segment at least one frame of the initial series of images into a foreground image of the foreground object and a background image of the physical background according to a first segmentation technique;
generate one or more virtual test background images;
evaluate the one or more virtual test background images according to a second segmentation technique;
select a final background image from the one or more virtual test background images; and send a command via the communications interface to an adjustable background to match the final background image.

9. The apparatus of claim 8, wherein the processor is further configured to:
obtain a subsequent series of images; and
segment frames of the subsequent series of images according to the second segmentation technique.

10. The apparatus of claim 8, wherein the processor is configured to generate the one or more virtual test background images by:
obtaining user profile information associated with a user captured in the initial series of images;
obtaining an indication of at least one physical characteristic of the foreground object captured in the initial series of images; and
combining the user profile information and the indication of the at least one physical characteristic to generate the one or more virtual test background images based on improving a segmentation according to the second segmentation technique.

11. The apparatus of claim 8, wherein the processor is configured to operate the first segmentation technique based on motion of the foreground object.

12. The apparatus of claim 8, wherein the processor is configured to operate the second segmentation technique based on at least one physical characteristic of the foreground object.

13. The apparatus of claim 12, wherein the at least one physical characteristic of the foreground object includes one or more colors in the foreground object.

14. The apparatus of claim 13, wherein the processor is configured to evaluate the one or more virtual test background images by comparing the one or more colors in the foreground object to a different background color of each of the one or more virtual test background images.

15. A system comprising:
an imaging device configured to capture images of a foreground object in front of an adjustable physical background; and
a conferencing endpoint configured to:
obtain an initial series of images from the imaging device;
segment at least one frame of the initial series of images into a foreground image of the foreground object and a background image of the adjustable physical background according to a first segmentation technique;
generate one or more virtual test background images;
evaluate the one or more virtual test background images according to a second segmentation technique;
select a final background image from the one or more virtual test background images; and
cause the adjustable physical background to match the final background image.

16. The system of claim 15, wherein the conferencing endpoint is further configured to:
obtain a subsequent series of images from the imaging device; and
segment frames of the subsequent series of images according to the second segmentation technique.

17. The system of claim 15, wherein the conferencing endpoint is configured to generate the one or more virtual test background images by:
obtaining user profile information associated with a user captured in the initial series of images;
obtaining an indication of at least one physical characteristic of the foreground object captured in the initial series of images; and
combining the user profile information and the indication of the at least one physical characteristic to generate the one or more virtual test background images based on improving a segmentation according to the second segmentation technique.

18. The system of claim 15, wherein the conferencing endpoint is configured to operate the first segmentation technique based on motion of the foreground object, and wherein the conferencing endpoint is configured to operate the second segmentation technique based on at least one physical characteristic of the foreground object.

19. The system of claim 18, wherein the at least one physical characteristic of the foreground object includes one or more colors in the foreground object.

20. The system of claim 19, wherein the conferencing endpoint is configured to evaluate the one or more virtual test background images by comparing the one or more colors in the foreground object to a different background color of each of the one or more virtual test background images.

* * * * *